United States Patent
Moshchuk et al.

(10) Patent No.: US 8,108,103 B2
(45) Date of Patent: Jan. 31, 2012

(54) NONLINEAR FREQUENCY DEPENDENT FILTERING FOR VEHICLE RIDE/STABILITY CONTROL

(75) Inventors: Nikolai K. Moshchuk, Grosse Pointe, MI (US); Flavio Nardi, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

(21) Appl. No.: 12/243,080

(22) Filed: Oct. 1, 2008

(65) Prior Publication Data

US 2010/0082202 A1    Apr. 1, 2010

(51) Int. Cl.
    *B60G 17/018*    (2006.01)
(52) U.S. Cl. .......................................... 701/37; 280/5.5

(58) Field of Classification Search ............... 701/37; 280/5.5, 5.515, 5.516
See application file for complete search history.

(56) References Cited

U.S. PATENT DOCUMENTS

| | | |
|---|---|---|
| 2005/0178628 A1 | 8/2005 | Uchino et al. |
| 2005/0206099 A1 | 9/2005 | Song |

*Primary Examiner* — Eric Culbreth
(74) *Attorney, Agent, or Firm* — John A. Miller; Miller IP Group, PLC

(57) ABSTRACT

A system and method for facilitating ride and stability control of a vehicle. The system includes a plurality of suspension displacement sensors, with each of the plurality of suspension displacement sensors positioned proximate to a suspension element of the vehicle. The system further includes a nonlinear filter for filtering out a wheel hop frequency from the suspension velocity corresponding to at least one of the plurality of suspension displacement sensors to obtain a resultant suspension velocity. The resultant suspension velocity is used by a control unit to determine the pitch velocity, roll velocity and the heave velocity of the vehicle.

20 Claims, 5 Drawing Sheets

NONLINEAR FREQUENCY DEPENDENT FILTERING FOR VEHICLE RIDE/STABILITY CONTROL

BACKGROUND OF THE INVENTION

1. Field of the Invention

This invention relates generally to vehicle ride and stability control and, more particularly, to a system and method for determining the pitch, roll and heave of a vehicle.

2. Description of the Related Art

The automotive industry makes considerable effort to improve the comfort and safety of the passengers of a vehicle by monitoring and controlling in real time the ride and stability of the vehicle dynamics. One problem typically encountered in ride and stability control of a vehicle is the estimation of the vehicle's dynamic states, i.e., roll, pitch and heave rates. Direct sensing of these vehicle dynamic states during the production phase of a vehicle is typically not feasible due to high cost and packaging issues.

Existing techniques for estimating the dynamic states of a vehicle typically use suspension deflection sensors. However, measurement readings from suspension deflection sensors contain frequencies of vertical wheel motion, that is, wheel hop frequencies, along with the frequencies of vehicle body motion. To accurately estimate the vehicle dynamic states, a filter must be implemented to separate the wheel hop frequency content from the vehicle body motion in the sensor measurements.

Linear filters are typically used for the purpose of removing wheel frequency components from the measurements of suspension deflection sensors. The linear filters, however, introduce an unacceptable delay in estimating the vehicle dynamic states. As a result, existing filtering methods are in general not able to provide vehicle dynamic state estimates without significant delay.

SUMMARY OF THE INVENTION

In accordance with the teachings of the present invention, a system and method for enabling ride and stability control of a vehicle are disclosed. The system includes a plurality of suspension displacement sensors, where a separate suspension displacement sensor is positioned proximate to each suspension element of the vehicle. The system further includes a nonlinear filter that filters out wheel hop frequencies from suspension velocity measurement signals received from the suspension displacement sensors to obtain a resultant suspension velocity. The resultant suspension velocity is used to determine the pitch velocity, roll velocity and heave velocity of the vehicle's sprung mass.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method that provide nonlinear frequency dependent filtering for facilitating vehicle ride and stability and control is merely exemplary in nature, and is in no way intended to limit the invention or its applications or uses.

Figure 1:
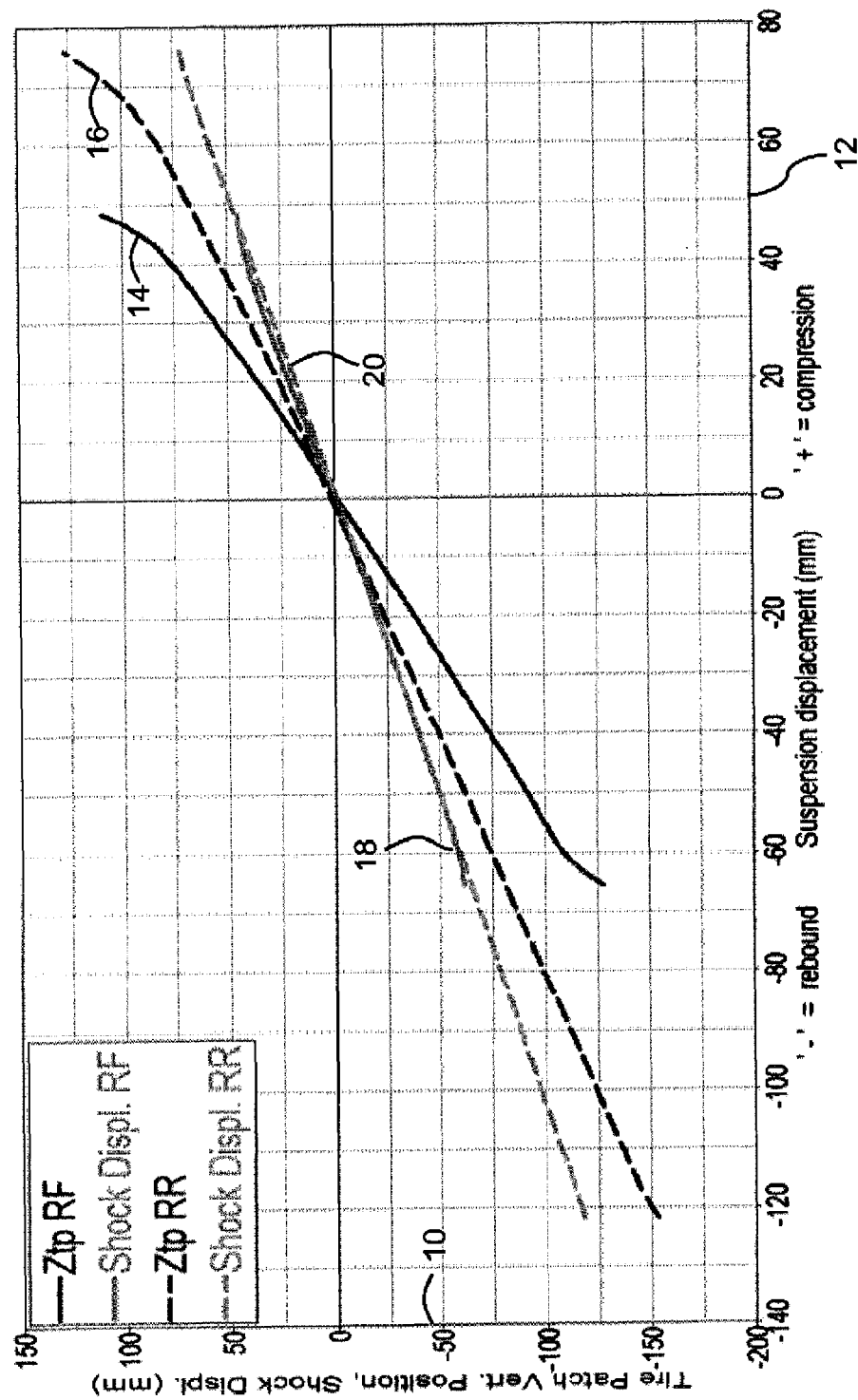
FIG. 1 is a chart of a vehicle suspension kinematics and compliance facility (K&C) test depicting variations in the vertical position of a tire patch and shock displacement with a change in suspension displacement, in accordance with an embodiment of the present invention.

FIG. 1 is a chart of a vehicle suspension kinematics and compliance facility (K&C) test depicting variations in the vertical position of a tire patch and shock displacement with a change in suspension displacement. Vehicle state estimation is a useful tool for designing an automotive control system that enhances safety and handling characteristics. State estimators may be either kinematic or dynamic. A kinematic observer relies on a kinematic relationship for steady-state maneuvers and requires special filtering of wheel hop frequency, that is, filtering the frequency of the vertical motion of the wheels of the vehicle from the frequency of vertical motion of the vehicle body. The observer reacts very quickly to road irregularities and runs very fast in real time. However, it may lead to errors during severe maneuvers. In contrast, a dynamic observer uses a dynamical vehicle model. A dynamic observer requires more computational power than the kinematic observer. The choice of vehicle state estimator depends on available sensors, the estimation procedure, and the ability to execute the resulting code in real time.

The present invention uses a kinematic estimator for vehicle state estimation. A special nonlinear filter is used to filter out wheel frequency components and K&C test results are used to develop a kinematic observer for vehicle state estimation. FIG. 1 depicts one of the outcomes of a K&C test, that is, the variation in the vertical position of a tire patch and shock displacement with a change in suspension displacement. The vehicle to be tested is mounted with at least one suspension deflection sensor proximate each suspension element present in the vehicle. The sensors are used to measure the displacement of the corresponding suspension element during the test. In the chart shown in FIG. 1, the X-axis 12 represents the suspension displacement in millimeters (mm) and the Y-axis 10 represents the vertical displacement of the tire patch and shock displacement. Curves 14 and 16 illustrate the variation of vertical displacement of the tire patch mounted on the right front and right rear positions of the vehicle, respectively, with the corresponding suspension displacement. It can be seen that the variation of the vertical displacement of the tire patch with the corresponding suspension displacement is mainly linear except for small portions at the end of wheel travel. For this reason, a nonlinear filter is used for filtering out the wheel hop frequency from the output of the suspension deflection sensors. Curves 18 and 20 illustrate the variation of shock displacement at the right rear and right front tires, respectively, with respect to suspension displacement. The determination of dynamic states of the vehicle by a kinematic observer with nonlinear filtering is as follows. For the purpose of this description, the calculations have been shown for a four wheeled vehicle.

The suspension deflection sensors measure the vertical displacements of the wheels relative to the vehicle body. The values Ztp_LF, Ztp_RF, Ztp_LR, and Ztp_RR are the vertical displacements of the tire patch with respect to the body at left front, right front, left rear and right rear corners of the vehicle, respectively, the values TW_Fr and TW_Rr are the front and rear track width, i.e., the horizontal distance between the center of the left side front wheel and the center of the right side front wheel, respectively, and the value WB is the wheelbase of the vehicle, i.e., the horizontal distance between the center of a front wheel and the center of the corresponding rear wheel.

The front roll angle of the vehicle body Roll_Fr is defined as the angle of rotation of the vehicle body about a longitudinal axis that passes through the vehicle, and can be calculated as:

$$\text{Roll\_Fr} = \frac{Ztp\_RF - Ztp\_LF}{TW\_Fr} \quad (1)$$

Similarly, the rear roll angle for the vehicle body Roll_Rr can be calculated as:

$$\text{Roll\_Rr} = \frac{Ztp\_RR - Ztp\_LR}{TW\_Rr} \quad (2)$$

The pitch angle of a vehicle body is defined as the angle of rotation about a transverse axis that passes through the left side of the vehicle to the right side of the vehicle. The pitch angles Pitch_LHS and Pitch_RHS of a vehicle body correspond to the left hand side and the right hand side of the vehicle, respectively, and can be calculated as:

$$\text{Pitch\_LHS} = \frac{Ztp\_LF - Ztp\_LR}{WB} \quad (3)$$

$$\text{Pitch\_RHS} = \frac{Ztp\_RF - Ztp\_RR}{WB} \quad (4)$$

For the final estimates of the roll and pitch angles for the entire vehicles, relationships between Roll_Fr, Roll_Rr, Pitch_LHS, and Pitch_RHS are needed. In one embodiment, the average value between the front roll angle and the rear roll angle is taken as the final roll angle estimate, and the average value between the left pitch angle and the right pitch angle is taken as the final pitch angle estimate.

Vertical displacement of the tire patch can be represented as a function of suspension displacement Z, where Ztp_LF=Ztp_LF(Z_LF), and where Z_LF is a suspension displacement at the left front corner. Similar relationships can be developed between the vertical displacements of the tire patches and the corresponding suspension displacements at the other corners of the vehicle.

Thus, vehicle roll and pitch angle become functions of suspension sensor displacements and can be represented as:

$$\text{Roll} = \frac{1}{2}\left(\frac{Ztp\_RF(Z\_RF) - Ztp\_LF(Z\_LF)}{TW\_Fr} + \frac{Ztp\_RR(Z\_RR) - Ztp\_LR(Z\_LR)}{TW\_Rr}\right) \quad (5)$$

$$\text{Pitch} = \frac{1}{2}\left(\frac{Ztp\_LF(Z\_LF) - Ztp\_LR(Z\_LR)}{WB} + \frac{Ztp\_RF(Z\_RF) - Ztp\_RR(Z\_RR)}{WB}\right) \quad (6)$$

Roll and pitch velocities of the vehicle body can be calculated through similar relationships to those mentioned in the above-mentioned equations, but suspension displacement must be replaced by the resultant suspension velocities. The resultant suspension velocity of a suspension element is the suspension velocity minus the velocity component induced due to the vertical motion of the wheels of the vehicle. Suspension velocities are obtained from the suspension displacements using a second-order digital differentiator that removes high frequency noise while the filtering the wheel hop frequency is done using a nonlinear filter. For dynamic maneuvers, the above-mentioned equations must be tuned using some reference angular velocities.

In one embodiment, an inertial measurement unit can be used for tuning. Further, for a given vehicle, the wheel base and the track width are constant.

Hence, it is possible to derive empirical formulas for roll and pitch velocities of the vehicle body by replacing the wheel base and the track width by their values for the given vehicle in the above equations and tuning them for dynamic states. In an exemplary embodiment, the values of such constants were calculated for the test vehicle and an empirical formula of roll velocity and pitch velocity were obtained for it during tuning. The empirical formula are given as:

$$\text{Roll\_Vel\_deg/sec} = 0.047442(V\_RF - V\_LF) + 0.034669(V\_RR - V\_LR) \quad (7)$$

$$\text{Pitch\_Vel\_deg/sec} = 0.0032906(V\_LF - V\_LR + V\_RF - V\_RR) \quad (8)$$

Where, V_LF, V_LR, V_RF, V_RR are the resultant suspension velocities in mm/sec and the resulting roll/pitch velocities are in deg/sec.

Heave velocity of the body of the vehicle is defined as the vertical velocity of the body of the vehicle. In one embodiment the heave velocity can be calculated using equation (9).

$$\text{Heave\_Vel\_mm/sec} = (V\_LF + V\_LR + V\_RF + V\_RR)/4 \quad (9)$$

Where, V_LF, V_LR, V_R, V_RR are as described above.

The process of obtaining a resultant suspension velocity from the corresponding suspension velocity is based on the analysis of the past history of the signal and fitting the signal with some known base function. The choice of the basis function is based on the known resonant frequencies of the vehicle body and wheel hop frequency. The details of the process are as follows.

Let f(t) be the suspension velocity which is the derivative of the suspension displacement sensor reading. Assume that the measurements of f(t) are available for the time interval [0, T]. The suspension velocity f(t) is assumed to be a sum of linear and periodic functions and is approximated by an approximation function g(t). The objective is to minimize the difference between f(t) and its approximation g(t) over the time interval [0, T] as:

$$\min\left(\frac{1}{T}\int_0^T [g(t)-f(t)]^2 dt\right) \quad (10)$$

Where g(t) is chosen as:

$$g(t)=C_1 \sin \omega t + C_2 \cos \omega t + C_3 + C_4 t \quad (11)$$

The unknown coefficients $C \propto [C_1, C_2, C_3, C_4]$ are determined from the optimization problem given by equation (12) below, where J(C) is a function to be minimized.

$$J(C) = \frac{1}{T}\int_0^T \begin{bmatrix} C_1 \sin\omega t + C_2 \cos\omega t + \\ C_3 + C_4 t - f(t) \end{bmatrix}^2 dt \to \min \quad (12)$$

This condition leads to a set of linear algebraic equations for the unknown coefficients C, using $\partial J/\partial C=0$. In matrix notation, these equations take the form $\Lambda C = B$, where the elements of matrices $\Lambda$ (4×4 matrix) and B (4×1 matrix) are defined as:

$$\Lambda(1,1)=\tfrac{1}{2}*(-\cos(\omega T)*\sin(\omega T)+\omega T)/\omega T \quad (13)$$

$$\Lambda(1,2)=\tfrac{1}{2}*\sin(\omega T)^2/\omega T \quad (14)$$

$$\Lambda(1,3)=-(\cos(\omega T)-1)/\omega T \quad (15)$$

$$\Lambda(1,4)=-(-\sin(\omega T)+\omega T\cos(\omega T))/\omega^2/T \quad (16)$$

$$\Lambda(2,1)=\Lambda(1,2) \quad (17)$$

$$\Lambda(2,2)=\tfrac{1}{2}*(\cos(\omega T)\sin(\omega T)+\omega T)/\omega T \quad (18)$$

$$\Lambda(2,3)=\sin(\omega T)/\omega T \quad (19)$$

$$\Lambda(2,4)=(\cos(\omega T)+\omega T\sin(\omega T)-1)/\omega^2/T \quad (20)$$

$$\Lambda(3,1)=\Lambda(1,3) \quad (21)$$

$$\Lambda(3,2)=\Lambda(23) \quad (22)$$

$$\Lambda(3,3)=1 \quad (23)$$

$$\Lambda(3,4)=T/2 \quad (24)$$

$$\Lambda(4,1)=\Lambda(1,4) \quad (25)$$

$$\Lambda(4,2)=\Lambda(2,4) \quad (26)$$

$$\Lambda(4,3)=\Lambda(3,4) \quad (27)$$

$$\Lambda(4,4)=T^2/3 \quad (28)$$

$$B(1) = \frac{1}{T}\int_0^T f(t)\sin\omega t\, dt \quad (29)$$

$$B(2) = \frac{1}{T}\int_0^T f(t)\cos\omega t\, dt \quad (30)$$

$$B(3) = \frac{1}{T}\int_0^T f(t)\, dt \quad (31)$$

$$B(4) = \frac{1}{T}\int_0^T f(t)t\, dt \quad (32)$$

The solution for the coefficients C are given by the equation $C=\Lambda^{-1}B$. Matrix $\Lambda$ is computed offline beforehand, while matrix B is computed online by analyzing the past history of the signal. These values are calculated for all points of time for which the input data is available. A similar procedure is followed with the output of the suspension displacement sensors placed at the other corners of the vehicle.

As known in the art, a filter introduces some delay while processing a signal. However, the proposed filter may sometimes compensate for the delay by calculating the resultant velocity at a future instant of time, that is, by calculating $\hat{f}(T)=g(T+\Delta T)$, where $\Delta T$ is said to be the "look ahead" time. It is important to reduce the delay in filtering so as to accurately control the vehicle in real time.

Figure 2:
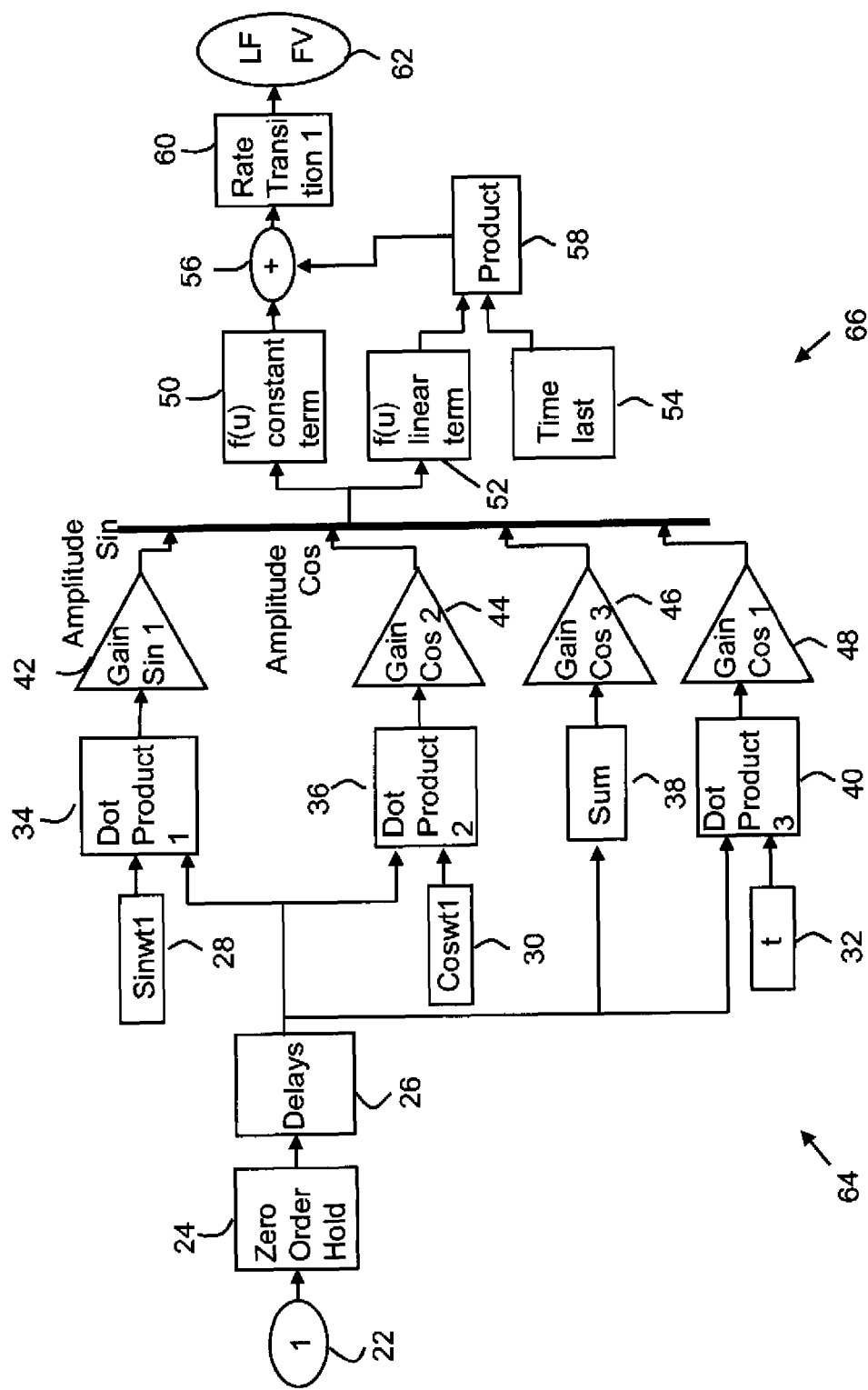
FIG. 2 is a block diagram showing a nonlinear filter in accordance with an embodiment of the present invention.

FIG. 2 is a block diagram of a system including a nonlinear filter 64 in accordance with an embodiment of the present invention. A signal of suspension velocity f(t) is received at node 22. The signal is then passed through a zero order hold device 24 and then stored in a certain number of tapped delays 26. The nonlinear filter 64 provides the [4×1] matrix B. The frequency ω is chosen to be 1.3 hz, a value that corresponds to the pitch natural frequency. The dot product of the suspension velocity signal with sin(ωt) at input 28 is calculated at box 34 and the result Gain Sin 1 and Amplitude Sin is obtained by amplifier 42. This operation basically realizes f(t)sin(ωt) or the first element of the matrix B, that is, B(1). Similarly, the dot product of the suspension velocity signal is obtained with Cos $\overline{\omega t}_1$ at input 30 to box 36 to obtain Gain Cos 2 and Amplitude Cos by gain amplifier 44. This operation basically realizes f(t)cos(ωt) or the second element of the matrix B, that is, B(2). At summation box 38, the summation of the suspension velocity signal is carried out at gain amplifier 46 to obtain $\int f(t)dt$ or the third element of the matrix B, that is, B(3). Finally, the dot product of the suspension velocity signal is obtained with time vector input 32 at box 40 to obtain $\int f(t)dt$ or the fourth element of the matrix B, that is, B(4).

The [4×4] matrix of coefficients C, that is, $\Lambda$ is calculated at every point of time for the corresponding [4×1] matrix B using the relationship $C=\Lambda^{-1}B$. Since the proposed filtering uses a certain number of past values—tapped delays (with length of the time interval T), down-sampling and rate transition is applied to adequately utilize the available memory. Right side part 66 of the system processes an initial resultant suspension velocity signal f(u) at boxes 50, 52, 54, 56 and 58. Further, rate transition is applied to the signal obtained at box 60 and the filtered signal of the resultant suspension velocity is obtained at output 62. The signal received at the output 62 is completely free of the wheel hop frequency.

Figure 3:
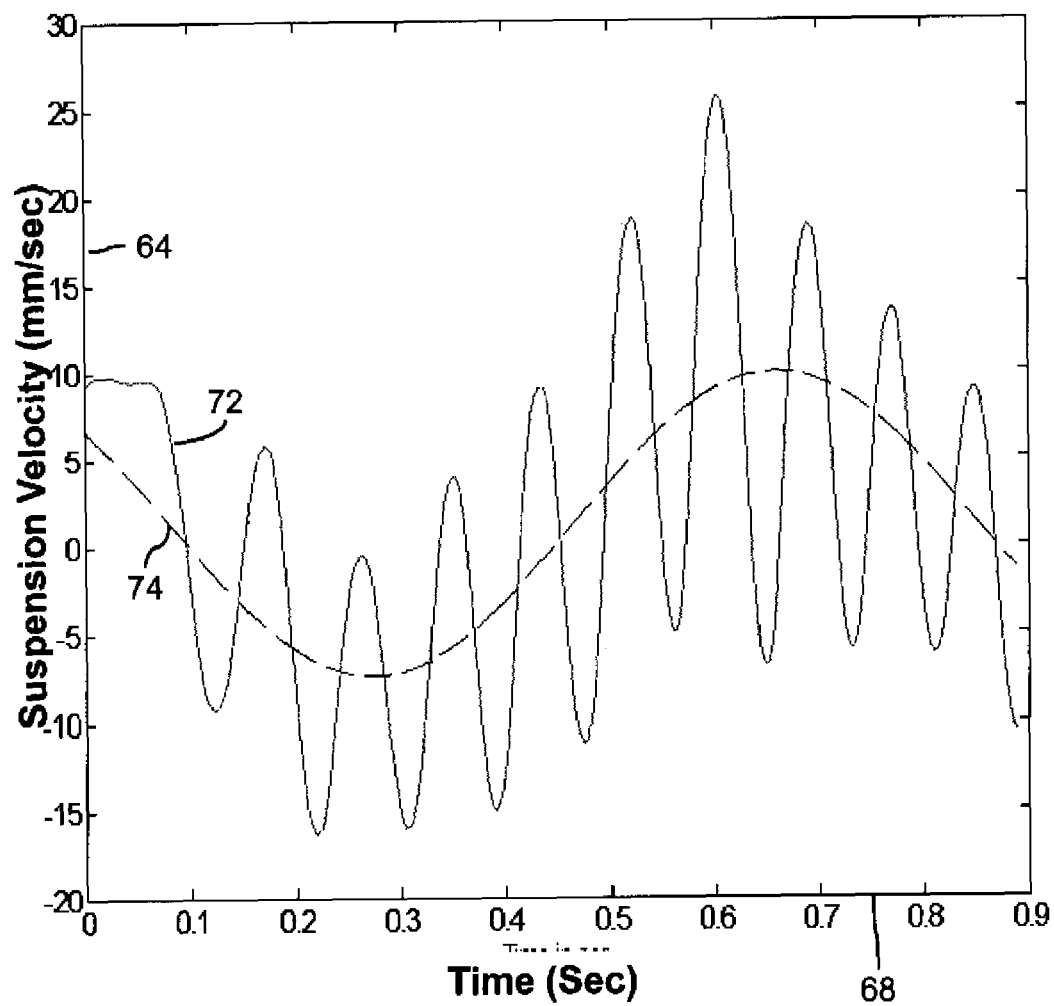
FIG. 3 is an exemplary chart illustrating the comparison between filtered (resultant suspension velocity) and unfiltered suspension velocity signals.

FIG. 3 is an exemplary chart illustrating the comparison between filtered (resultant suspension velocity) and unfiltered suspension velocity signals. The X-axis 68 is shown to represent time in seconds while the Y-axis 64 represents suspension velocity in mm/sec. Solid line 72 is the unfiltered signal with about ten oscillations in one second. Unfiltered signal 72 corresponds to a suspension velocity including a wheel hop frequency component. The dotted line 74 is the filtered signal, that is, the resultant velocity, which is completely free of the wheel hop frequency. It can be clearly seen that filtering removes the noise and results in a signal which can facilitate a better and more accurate ride and stability control.

Figure 4:
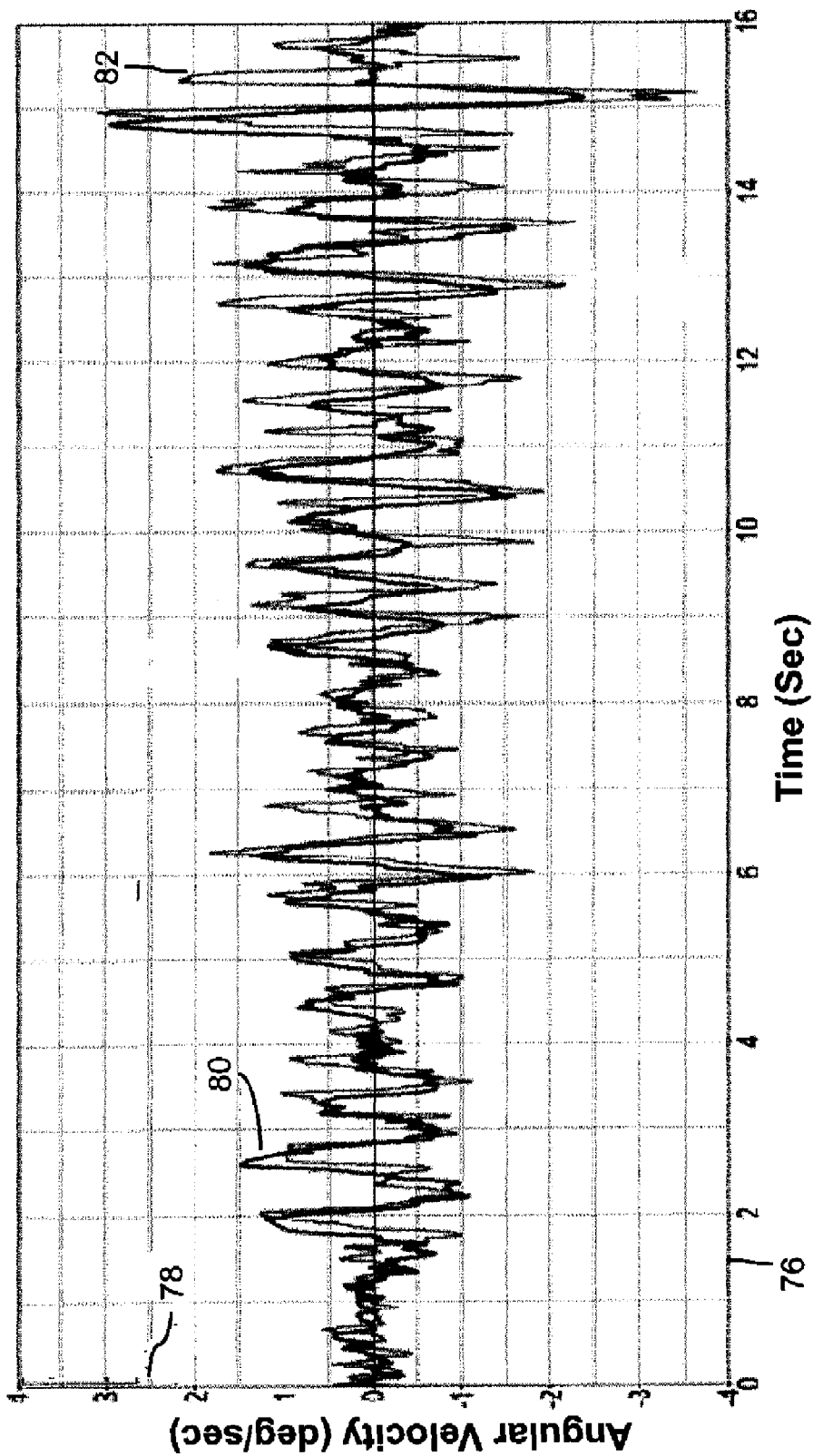
FIG. 4 is an exemplary chart showing a comparison between the pitch velocity estimated using a kinematic observer and the pitch velocity measured using an inertial measurement unit.

FIG. 4 is an exemplary chart showing a comparison between the pitch velocity estimated using a kinematic observer and the pitch velocity measured using an inertial measurement unit. The X-axis 76 is shown to represent time in seconds and the Y-axis 78 represents pitch velocity in deg/sec. Curves 80 and 82 represent the pitch velocities measured with an inertial measurement unit and estimated with the kinematic observer respectively. As can be seen, the correlation between the plots is good. Hence, a kinematic observer can be used in the present invention without compromising the accuracy of the results.

Figure 5:
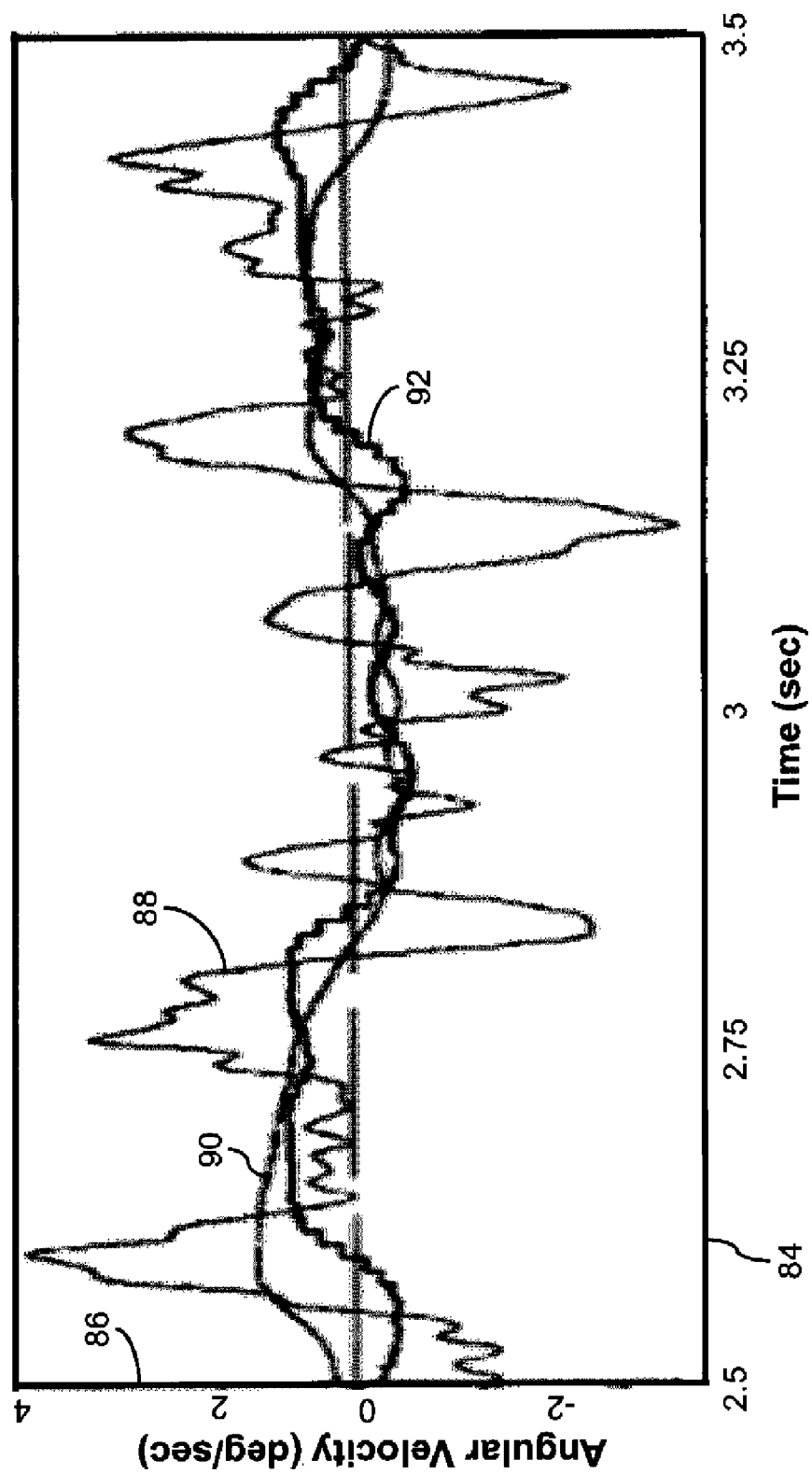
FIG. 5 is an exemplary chart showing a comparison between the pitch velocities estimated using a kinematic observer, using a kinematic observer with the velocity being unfiltered, and measured using an inertial measurement unit.

FIG. 5 is an exemplary chart showing a comparison between the pitch velocities estimated using a kinematic observer, using a kinematic observer with the velocity being unfiltered, and using an inertial measurement unit. The X-axis 84 is shown to represent time in seconds and the Y-axis 86 represents pitch velocity in deg/sec. Curves 88 and 90 represent the pitch velocities measured with an inertial measurement unit and estimated by the kinematic observer respectively while the curve 92 represents the unfiltered pitch velocity estimated by the kinematic observer. It can be clearly seen that the filtering method removes the noise and delivers a signal which can enable more accurate ride and stability control.

Various embodiments of the present invention offer one or more advantages. The present invention provides a system and a method for enabling ride and stability control of a vehicle. The system of the present invention uses a nonlinear filter that effectively filters out the wheel hop frequency from the suspension velocity, hence giving a more accurate input to the vehicle ride and stability control system leading to better ride control. Further, the nonlinear filter of the system is configured to compensate for the delay introduced by conventional filters while processing signals.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for facilitating ride and stability control of a vehicle, the vehicle including a plurality of suspension displacement sensors where a suspension displacement sensors is positioned proximate to a suspension element of the vehicle, said method comprising:
obtaining a suspension velocity corresponding to at least one of the plurality of suspension displacement sensors;
filtering out a wheel hop frequency from the suspension velocity to obtain a resultant suspension velocity, where the filtering is done using a nonlinear filter; and
determining at least one of a pitch velocity of the vehicle, a roll velocity of the vehicle, and a heave velocity of the vehicle based on the filtered resultant suspension velocity.

2. The method according to claim 1 wherein the suspension velocity is obtained by differentiating a measurement of the suspension displacement sensor.

3. The method according to claim 1 wherein the resultant suspension velocity is obtained using a base function.

4. The method according to claim 3 wherein the base function is a sum of linear and periodic functions.

5. The method according to claim 4 wherein the base function is $C_1 \sin \omega t + C_2 \cos \omega t + C_3 + C_4 t$, where $\omega$ is the roll or pitch or heave frequency, t is time, and $C_1$, $C_2$, $C_3$, and $C_4$ are constants.

6. The method according to claim 5 wherein the constants $C_1$, $C_2$, $C_3$, and $C_4$ are determined by minimizing the difference between the suspension velocity and the base function.

7. The method according to claim 1 wherein the resultant suspension velocity is calculated at a first instant of time occurring later than a second instant of time for obtaining the corresponding suspension velocity.

8. The method according to claim 1 wherein the at least one of a pitch velocity of the vehicle, a roll velocity of the vehicle, and a heave velocity of the vehicle is determined using the expressions:

$$\text{Roll\_Velocity\_deg/sec} = 0.047442(V\_RF - V\_LF) + 0.034669(V\_RR - V\_LR)$$

$$\text{Pitch\_Velocity\_deg/sec} = 0.0032906(V\_LF - V\_LR + V\_RF - V\_RR)$$

$$\text{Heave\_Velocity\_mm/sec} = (V\_LF + V\_LR + V\_RF + V\_RR)/4$$

where V_LF is the suspension velocity of a suspension element placed proximate to a left front end of the vehicle, V_LR is the suspension velocity of a suspension element placed proximate to a left rear end of the vehicle, V_RF is the suspension velocity of a suspension element placed proximate to a right front end of the vehicle, and V_RR is the suspension velocity of a suspension element placed proximate to a right rear end of the vehicle, and the resulting roll velocity, pitch velocity, and heave velocity are in degree/second.

9. A method for facilitating ride and stability control of a vehicle, the vehicle including a plurality of suspension displacement sensors where a suspension displacement sensors is positioned proximate to a suspension element of the vehicle, said method comprising:
obtaining a suspension velocity corresponding to at least one of the plurality of suspension displacement sensors, where the suspension velocity is obtained by differentiating a measurement of the corresponding suspension displacement sensor;
filtering out a wheel hop frequency from the suspension velocity to obtain a resultant suspension velocity, where the filtering is done using a nonlinear filter, wherein the resultant suspension velocity is obtained using a base function, and wherein the base function is a sum of linear and periodic functions; and
determining at least one of a pitch velocity of the vehicle, a roll velocity of the vehicle, and a heave velocity of the vehicle based on the resultant suspension velocity.

10. The method according to claim 9 wherein the base function is $C_1 \sin \omega t + C_2 \cos \omega t + C_3 + C_4 t$, where $\omega$ is the roll or pitch or heave frequency, t is time, and $C_1$, $C_2$, $C_3$, and $C_4$ are constants.

11. The method according to claim 10 wherein the constants $C_1$, $C_2$, $C_3$, and $C_4$ are determined by minimizing the difference between the suspension velocity and the base function.

12. The method according to claim 9 wherein the at least one of a pitch velocity of the vehicle, a roll velocity of the vehicle, and a heave velocity of the vehicle is determined using any of the expressions:

$$\text{Roll\_Velocity\_deg/sec} = 0.047442(V\_RF - V\_LF) + 0.034669(V\_RR - V\_LR)$$

$$\text{Pitch\_Velocity\_deg/sec} = 0.0032906(V\_LF - V\_LR + V\_RF - V\_RR)$$

$$\text{Heave\_Velocity\_mm/sec} = (V\_LF + V\_LR + V\_RF + V\_RR)/4$$

wherein V_LF is the suspension velocity of the suspension element placed proximate to the left front end of the vehicle, V_LR is the suspension velocity of the suspension element placed proximate to the left rear end of the vehicle, V_RF is the suspension velocity of the suspension element placed proximate to the right front end of the vehicle; and V_RR is the suspension velocity of the suspension element placed proximate to the right rear end of the vehicle, and the resulting roll velocity, pitch velocity; and heave velocity are in degree/second.

13. A system for facilitating ride and stability control of a vehicle, said system comprising:
   a plurality of suspension displacement sensors, wherein a suspension displacement sensor is positioned proximate to a suspension element of the vehicle;
   a nonlinear filter for filtering out a wheel hop frequency from the suspension velocity corresponding to at least one of the plurality of suspension displacement sensors to obtain a resultant suspension velocity; and
   a control unit for determining at least one of a pitch velocity of the vehicle, a roll velocity of the vehicle, and a heave velocity of the vehicle based on the resultant suspension velocity corresponding to at least one of the plurality suspension displacement sensors.

14. The system according to claim 13 wherein a second-order digital differentiator is used to obtain the suspension velocity by differentiating a reading of the corresponding suspension displacement sensor.

15. The system according to claim 13 wherein the resultant suspension velocity is obtained by using a base function.

16. The system according to claim 15 wherein the base function is a sum of linear and periodic functions.

17. The system according to claim 16 wherein the base function is $C_1 \sin \omega t + C_2 \cos \omega t + C_3 + C_4 t$, where $\omega$ is the roll or pitch or heave frequency, t is time, and $C_1$, $C_2$, $C_3$, and $C_4$ are constants.

18. The system according to claim 17 wherein the constants $C_1$, $C_2$, $C_3$, and $C_4$ are determined by minimizing the difference between the suspension velocity and the base function.

19. The system according to claim 13 wherein the resultant suspension velocity is calculated at a first instant of time occurring later than a second instant of time of obtaining of the corresponding suspension velocity.

20. The system according to claim 13 wherein the at least one of a pitch velocity of the vehicle, a roll velocity of the vehicle, and a heave velocity of the vehicle is determined using any of the expressions:

$$\text{Roll\_Velocity\_deg/sec} = 0.047442(V\_RF - V\_LF) + 0.034669(V\_RR - V\_LR)$$

$$\text{Pitch\_Velocity\_deg/sec} = 0.0032906(V\_LF - V\_LR + V\_RF - V\_RR)$$

$$\text{Heave\_Velocity\_mm/sec} = (V\_LF + V\_LR + V\_RF + V\_RR)/4$$

wherein V_LF is the suspension velocity of the suspension element placed proximate to the left front end of the vehicle, V_LR is the suspension velocity of the suspension element placed proximate to the left rear end of the vehicle, V_RF is the suspension velocity of the suspension element placed proximate to the right front end of the vehicle; and V_RR is the suspension velocity of the suspension element placed proximate to the right rear end of the vehicle, and the resulting roll velocity, pitch velocity and heave velocity are in degree/second.

* * * * *